(12) United States Patent
Unkles

(10) Patent No.: US 6,180,203 B1
(45) Date of Patent: Jan. 30, 2001

(54) ROTATIONAL MOULDING PROCESS

(76) Inventor: Peter J. Unkles, 13 Rosserdale Cresent, Mt. Eliza, Victoria 3930 (AU)

(*) Notice: Under 35 U.S.C. 154(b), the term of this patent shall be extended for 0 days.

(21) Appl. No.: 09/171,237

(22) PCT Filed: Apr. 9, 1997

(86) PCT No.: PCT/AU97/00224
§ 371 Date: Oct. 14, 1998
§ 102(e) Date: Oct. 14, 1998

(87) PCT Pub. No.: WO97/38839
PCT Pub. Date: Oct. 23, 1997

(30) Foreign Application Priority Data

Apr. 16, 1998 (AU) .................................................... PN9281

(51) Int. Cl.⁷ .......................... B29C 41/04; B29C 44/06; B32B 3/10
(52) U.S. Cl. ......................... 428/71; 108/51.11; 264/45.3; 264/45.7; 264/54; 264/311; 264/911; 404/25; 428/304.4; 428/313.3; 428/316.6; 428/903.3
(58) Field of Search .................................. 264/45.7, 310, 264/311, 911, 920, 54, 45.3; 428/71, 304.4, 313.3, 316.6, 903.3; 404/25; 108/51.11

(56) References Cited

U.S. PATENT DOCUMENTS

| | | | |
|---|---|---|---|
| 3,391,823 | * | 7/1968 | Tijms .................. 264/45.7 |
| 3,542,912 | | 11/1970 | Rielly et al. . |
| 3,853,972 | * | 12/1974 | Berner .................. 264/53 |
| 3,875,275 | * | 4/1975 | Lemelson ............. 264/45.7 |
| 3,976,730 | * | 8/1976 | Cushing ................ 264/37 |
| 4,255,372 | * | 3/1981 | Kuhnel et al. ......... 264/54 |
| 4,533,696 | | 8/1985 | Schrijver et al. . |
| 5,783,611 | * | 7/1998 | Strebel ................ 264/45.7 |
| 5,814,673 | * | 9/1998 | Khait .................. 521/40.5 |

FOREIGN PATENT DOCUMENTS

| | | | |
|---|---|---|---|
| 983226 | * | 2/1976 | (CA) ................... 264/45.7 |
| 1190379 | | 5/1970 | (GB) . |
| 2 228 891 | | 9/1990 | (GB) . |
| 95/19877 | | 7/1995 | (WO) . |
| 95/22449 | | 8/1995 | (WO) . |
| 96/15892 | | 5/1996 | (WO) . |
| 96/33060 | | 10/1996 | (WO) . |

* cited by examiner

Primary Examiner—Allan R. Kuhns
(74) Attorney, Agent, or Firm—Hudak & Shunk Co., L.P.A.

(57) ABSTRACT

A method for rotational molding of articles, including the step of rotationally molding a mixture of particulate plastics material comprising at least one thermoplastics material having a first particle size and a second thermoplastics material having a larger particle size wherein, in use, said first thermoplastic material fuses to form an outer skin and subsequently said second thermoplastics material fuses to form an inner skin bonded to the outer skin of a resultant molded article. The method may also include the step of incorporating a quantity of rollable molded reinforcing elements in the mold with said first and second thermoplastics materials, wherein the reinforcing elements are located in a spaced array thereby forming bridges between opposed inner skin surfaces as they expand. Articles, such as a shipping pallet, rotationally molded using the method are also disclosed.

17 Claims, 3 Drawing Sheets

ROTATIONAL MOULDING PROCESS

FIELD OF THE INVENTION

This invention relates to rotational moulding of plastics articles and in particular to the manufacture of moulded plastics articles having an outer skin and an inner core.

BACKGROUND TO THE INVENTION

Rotational moulding of thermoplastics material is a convenient and cost effective method for the manufacture of a wide variety of articles, ranging in size from domestic containers and toys to large liquid storage tanks.

Rotational moulding processes are characterised by low capital costs for molds and other apparatus when compared with injection moulding processes for example. They are further characterised by relatively short setup times, the capacity for economic low volume manufacturing and immense flexibility in product size range.

Typical thermoplastics materials employed in rotational moulding processes are the polyolefins, including polyethylene and polypropylene, polyvinyl-chloride, polycarbonates, nylon, and acrylobutadiene-styrenes (ABS). In this respect virtually any thermoplastic resins are suitable for use in rotational moulding, including copolymeric materials and mixtures of compatible resins.

Products produced by rotational moulding are generally characterised by good strength and structural integrity, abrasion resistance, weather resistance including UV stability, wide colour range, selectable surface finish from high gloss to matt and textured, chemical resistance and environmental stress crack resistance (ESCR).

Although generally satisfactory for most purposes, in certain applications rotationally moulded products lack stiffness, impact resistance (particularly at low temperatures), and load bearing capacity (particularly at elevated temperatures). These deficiencies generally arise from the relatively low wall thickness of products produced by rotational moulding which are inherently due to thermal conductivity and cost constraints.

Growing environmental concerns over the disposal of plastics waste has focussed the need for recycling of plastics materials reclaimed subsequent to use by domestic or industrial consumers. One of the major difficulties in recycling such reclaimed plastics is contamination. Contamination can arise from inadequate sorting of polymeric species which is difficult to achieve by unskilled manual labour and virtually impossible to automate.

Mixtures of plastics species are difficult to process due to differing melt temperatures and viscosities as well as inherent chemical incompatibility. Other sources of contamination, apart from dirt and dust, are paper and plastics film labels, non-plastics container seals and incompletely discharged contents of such containers.

A method for manufacturing products using reclaimed plastics, typically polyolefins, employs an injection extrusion process whereby granulated plastics waste is subjected to working under high shear conditions in an extruder. The compounded plastics issuing from the extruder is pumped directly, under screw pressure, into a shaped hollow die and allowed to cool, in a manner similar to injection moulding.

The injection extrusion of reclaimed plastics is generally used to produce articles such as plank members for outdoor seating, tree and shrub surrounds, garden edging, man-hole covers and pits for underground utilities or shipping pallets. The articles are characterised by high mass, bulky shape, limited colour range, poor chemical resistance, poor ESCR and UV resistance along with inferior mechanical properties. The surface of such articles is uneven or porous and thus difficult to keep clean. Textured finishes, as required for slip resistance on man-hole covers, are difficult to reproduce.

These characteristics of reclaimed plastics products result from contamination and chemical incompatibility problems and the use of a dark pigment, usually black brown or grey, to mask unsightly flow marks from inadequately blended plastics of differing colours and viscosities. A large amount of expensive pigment must be added to achieve even a reasonable colour finish.

The applicant's Australian Patent Application No. 40440/95 describes a method for the manufacture of moulded plastics articles which combines certain advantages of conventional rotational moulding with certain advantages of injected cores to selectively overcome disadvantages of each process.

The applicant's earlier method comprises a two cycle method of first rotationally moulding a thin walled hollow body and secondly introducing into the core of said hollow body a flowable mass of plastics material, preferably reclaimed plastics material, to occupy substantially the entire volume of the core of said hollow body. This method is particularly suited to producing relatively large thin walled objects such as buoyancy modules or liquid storage tanks.

Whilst suitable for thin walled objects, the applicant's earlier method consumes a large amount of reclaimed plastics in the production of articles that have a core volume commensurate with the overall size of the article, thus resulting in a high mass product.

Consequently there is a need for an improved method which incorporates the benefits of the double skin structure of the prior art method but utilises less material to produce articles that are lighter in weight whilst maintaining their structural integrity. Furthermore it would be advantageous if the method required only a single cycle rotational moulding process, rather than the prior art two cycle method of forming the outer skin followed by introducing the flowable reclaimed plastics material to form the core.

The improved method is suited to the production of bulky articles, such as pallets, lids for industrial waste bins and tanks, covers for utility access ways, pits (eg. for underground cable or conduit systems), or structural members such as wall, roof, or floor panels.

OBJECT OF THE INVENTION

It is an object of the present invention to provide an improved rotational moulding method that overcomes at least some of the disadvantages of prior art moulding methods.

It is a further object of the invention to provide an improved rotational moulding method for producing composite products that have the advantages of virgin thermoplastics without some of the disadvantages of mixed reclaimed plastics incorporated therein.

Further objects will be evident from the following description.

DISCLOSURE OF THE INVENTION

In one form, although it need not be the only or indeed the broadest form, the invention resides in a method for rotational moulding of articles, including the step of rotationally moulding a mixture of particulate plastics material comprising at least one thermoplastics material having a first particle size and a second thermoplastics material comprised of reclaimed plastics material and having a larger particle size wherein, in use, said first thermoplastic material fuses to form an outer skin and subsequently said second thermoplastics material fuses to form an inner skin bonded to the outer skin of a resultant moulded article.

The melt temperature of the second thermoplastics material may be higher than the melt temperature of the first thermoplastics material.

In preference the first thermoplastics material is homopolymeric.

The second thermoplastics material may be a mixture of polymeric species.

Preferably the second thermoplastics material includes a quantity of thermosetting polymeric material.

In preference the second thermoplastics material includes a quantity of foaming agent.

The decomposition temperature of the foaming agent is preferably greater than the melt temperature of the second thermoplastics material.

Preferably the second thermoplastics material includes a quantity of filler material.

If required particles of the second thermoplastics material may include an adhesion resistant coating to reduce adhesion between the second thermoplastics material and the first thermoplastics material during the fusing of the outer skin.

In a further form of the invention the method may also include the step of incorporating a quantity of rollable moulded reinforcing elements in the mold with said first and second thermoplastics materials, wherein the reinforcing elements are located in a spaced array thereby forming bridges between opposed inner skin surfaces as they expand.

Suitably, the reinforcing elements are larger than the particle size of the second thermoplastics material.

The reinforcing elements may be generally spherical or generally cylindrical.

Preferably the reinforcing elements are mechanically engaged between the opposed inner skin surfaces.

In preference, the reinforcing elements are at least partially fused to said opposed inner skin surfaces.

The reinforcing elements may include an adhesion resistant coating, such as talc, to reduce adhesion between the reinforcing elements and the first and second thermoplastics materials during the fusing of said skins.

If required, the reinforcing elements may include an adhesion resistant additive to reduce adhesion between the reinforcing elements and the first and second thermoplastics materials during the fusing of said skins.

Suitably, the adhesion resistant additive may be selected from one of a soap, such as calcium stearate or the like, a silicone oil or a suitable plasticiser.

The reinforcing elements may be of a solid, hollow or foamed construction.

Preferably the reinforcing elements may be comprised of virgin or reclaimed plastics material.

If required, the reinforcing elements may be comprised of ceramics material.

In a yet further form of the invention the method may also include the step of incorporating a reinforcement structure at predetermined locations in the mold with said first and second thermoplastics materials.

The reinforcement structure may be constructed of plastics or metallic material or a combination of both.

Preferably the reinforcement structure comprises steel or aluminium mesh.

If required the reinforcing structure may comprise angle or channel profiled members.

In a still further form, the invention resides in an article manufactured using the improved rotational moulding method disclosed herein.

The article may comprise a shipping pallet, man-hole cover, tank lid, utility pit cover or the like.

The article may comprise a structural member, such as a wall panel, floor panel, roof panel or the like.

In another form, the invention resides in a rotationally moulded shipping pallet having a supporting surface and a series of leg means depending therefrom, wherein said surface includes a plurality of recesses which are arranged to locate pallets relative to one another when two or more are stacked.

Preferably the leg means comprise rails depending from opposite ends of the pallet and a central rail extending congruently to said end rails.

Preferably the rails include a series of depending lugs which cooperate with said plurality of recesses.

BRIEF DESCRIPTION OF THE DRAWINGS

To assist in understanding the invention preferred embodiments will now be described with reference to the following figures in which.

DETAILED DESCRIPTION OF THE DRAWINGS

Figure 1:
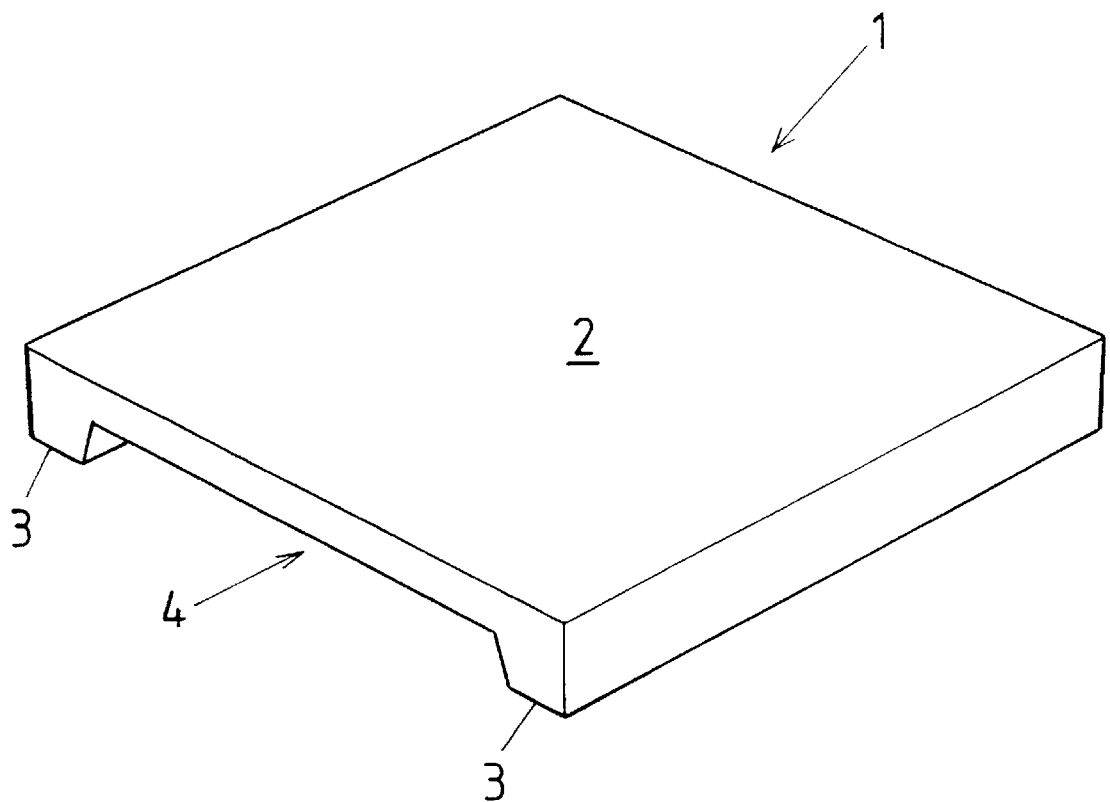
FIG. 1 is a perspective view of a shipping pallet manufactured in accordance with an embodiment of the invention.

In the drawings, like reference numerals refer to like parts. Referring to FIG. 1, the shipping pallet 1 of the embodiment comprises a deck 2, and rails 3 thereby providing a raised portion 4 facilitating insertion of the tines of a fork-lift truck or similar transportation means.

Figure 2:
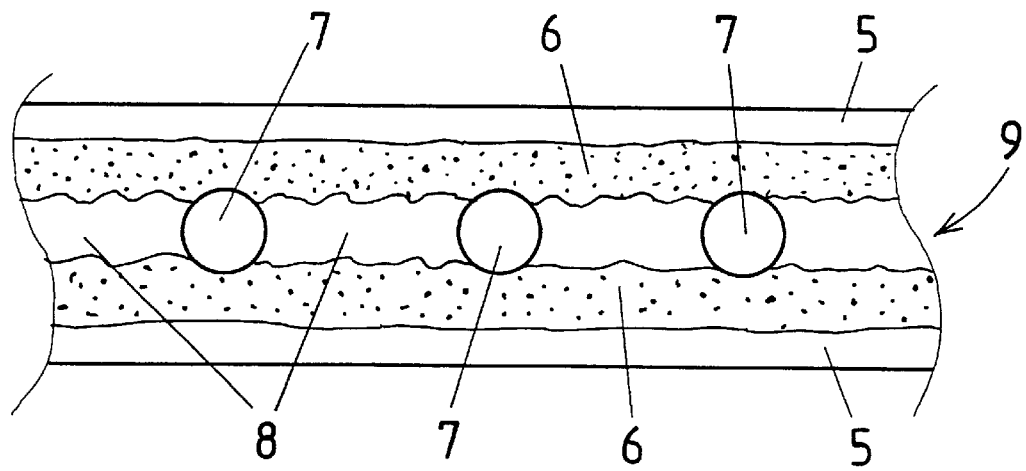
FIG. 2 is a partial elevational cross-section of the shipping pallet illustrated in FIG. 1.

FIG. 2 is a schematic cross-section illustrating the construction of the pallet 1, which comprises an outer skin 5, a foamed inner skin 6, spaced reinforcing members 7 in the form of foamed macro-spheres and residual voids 8. The random spaced array of reinforcing members forms a bridging layer 9 between opposed inner surfaces of the inner skin 6.

In the embodiment the outer skin layer 5 is formed from a virgin polyolefin, typically an opaque polyethylene, which can provide a smooth or textured surface as required. The outer skin may also be coloured as desired, of food handling grade and UV resistant. The inner foamed skin 6 is also formed from a polyolefin, but typically of mixed reclaimed plastic which has been pre-extruded in granular form and incorporates a chemical foaming or blowing agent.

The bridging layer 9 comprises rollable reinforcing elements in the form of balls or macro-spheres. The reinforcing elements are pre-formed by rotational or injection moulding, typically also from reclaimed plastics. In the embodiment the reinforcing elements are foamed polyolefin, but may alternatively be of solid or hollow construction. The balls are of a diameter appropriate to the gap between the opposed inner skin surfaces, in this case around 50 mm. In other embodiments the reinforcing elements may be of any appropriate rollable shape, such as cylindrical pellets, and alternatively formed by extrusion or other suitable process.

The rotational moulding process uses a mold formed to the desired outer shape of the pallet. Shipping pallets are generally 1200 mm square by about 140 mm deep. The ingredients are initially introduced into the mold, as follows:

(a) approximately 5 kg of virgin polyethylene in the form of powder or micro-pellets averaging 0.5 mm in diameter, the polyethylene having a melting point of approximately 160 deg C.;

(b) approximately 10 kg of mixed reclaimed polyolefin plastics in the form of pre-extruded pellets averaging 3 mm in diameter, the reclaimed plastics having a melting point in the approximate range of 165 to 220 deg C.; the foaming agent incorporated into the pellets having a decomposition temperature of approximately 220 deg C.; and (c) approximately 3 kg of pre-moulded balls of reclaimed foamed polyolefin, 50 mm in diameter.

The rotational moulding apparatus (not shown) can be any of the known forms, but would preferably be an oven type machine with computer process control providing, inter alia, precise control of the oven temperature and the rotation and oscillation speeds of a two-axis mold drive rig. The mold is sealed after the ingredients are loaded and the following process steps effected by the rotational moulding apparatus, during which time the mold is rotated and oscillated at pre-selected speeds:

(I) The oven is heated to a temperature of 300 deg C. and held for a period of 5 minutes, so as to fuse the polyethylene powder and lay down the outer skin on the inward facing walls of the mold. The finer powder or micro-pellets separate from the larger inner skin foamable pellets under the tumbling action within the slowly rotating mold. This effect leads to the preferential laying down of the outer skin, which may be assisted by the addition of talc surface coating on the pre-extruded pellets to slow the tendancy of the pellets to adhere to the virgin plastics material whilst it melts onto the mold surface.

(II) The oven is then elevated to a temperature of 320 deg C. and held for a period of 5 minutes, so as to melt and fuse the reclaimed plastics pellets thereby forming the inner skin on the inward facing surface of the outer skin layer.

(III) During the preceding steps, the pre-moulded balls roll around inside the mold while the outer and inner skin layers are laid down in the mold. The balls are surface coated with talc in the embodiment, to slow or minimise them adhering prematurely to either skin.

(IV) The oven is further elevated to a temperature of 360 deg C. for a period of 3 minutes to effect decomposition of the blowing agent, which expands the volume of the inner skin. This expansion traps the balls between, and in some instances partially embeds them in, the inward facing surfaces of the inner skin.

(V) Cooling the mold to a temperature of at least 50 deg C. for a period of 10 minutes, typically by quenching the mold with water to cool and solidify the skins on the inside of the mold.

(VI) The cooling step tends to effect a slight shrinkage of the product from the inward facing walls of the mold, which eases release when the mold is finally opened. The process produces a pallet having a double skinned wall and a spaced array of reinforcing elements in the form of foamed balls.

It should be noted that the oven temperature refers to the ambient temperature within the oven, whereas the temperature within the mold itself will be somewhat lower due to heat transfer effects. However the temperature gradient within the mold generally assists the process.

The selection of appropriately graded particle or granule size for the plastics materials comprising the skins, so as to take advantage of the separation effected by the mold tumbling action, allows all ingredients to be loaded into the mold and the product manufactured using a single rotational moulding cycle.

This effect may be enhanced by appropriate selection of the melt temperature and melt flow, as measured by the melt flow index (MFI), for the plastics materials. See for example the melt temperatures set out above in relation to the preferred embodiment. Similar enhancement may be achieved by the selection of mold rotation speeds for each step.

The provision of a spaced array of reinforcing members, whether in the form of balls or cylindrical pellets, provides improved strength and rigidity for the finished product without the weight penalty associated with solid or semi-solid cores. It is to be noted that, in other embodiments of the invention where there is a product requirement for slimmer walls, the reinforcing elements may be omitted because the plastics material for the inner skin can be chosen such that opposing surfaces of the inner skin touch one another after foaming.

In embodiments which employ reclaimed plastics material for the inner skin avoid any need for adding pigments during the pre-extrusion process, because it is hidden by the opaque outer skin. Similarly the reclaimed plastics need not be pre-sorted by colour. Although principally constituted from reclaimed polyolefins, granulated scrap plastics such as thermosetting polymers may be incorporated into the inner skin material, because the pre-extrusion process partially homogenises the reclaimed plastics. The second thermoplastics material can include organic or inorganic filler material. An example of a suitable inorganic filler material is talc, whilst the organic filler material could be cellulosic including recycled newspapers, rice or peanut hulls.

Figure 3:
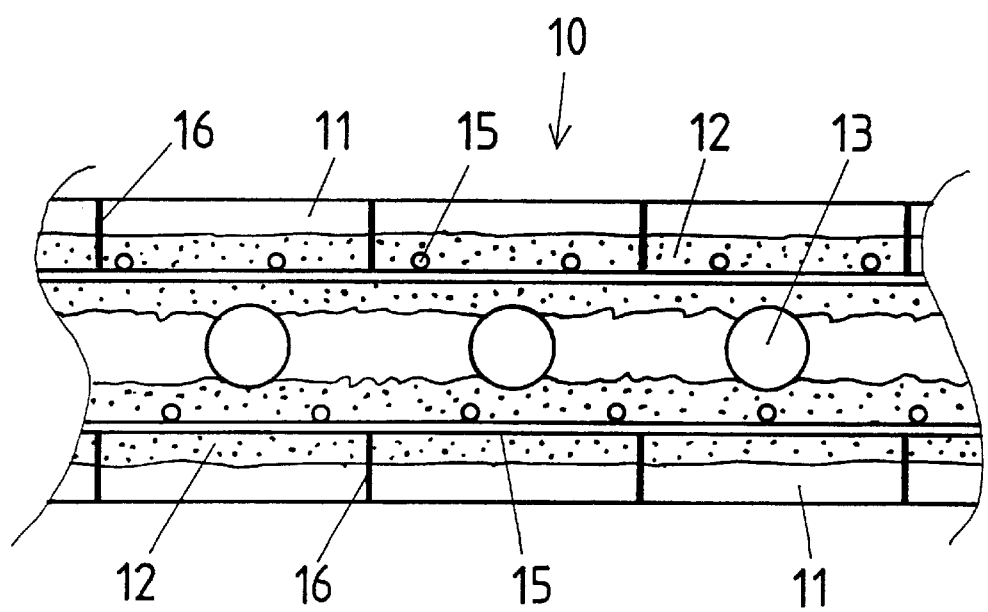
FIG. 3 is a partial elevational cross-section of a structural panel made in accordance with another embodiment of the invention.

FIG. 3 shows a schematic cross-section of a building panel made using a further embodiment of the invention. In cases where panels require additional strength for use in building applications or the like, reinforcing means in the form of metallic mesh, for example, may be incorporated into the mold as part of the rotational moulding process.

The building panel 10 includes an outer skin 11, an inner skin 12, a spaced array of macro-spheres 13 forming a bridging layer 14 between inward facing surfaces of the inner skin. Substantially encapsulated in the inner skin is a prefabricated aluminium mesh 15.

During assembly of the mold for the building panel, the mesh members are located therein and spaced therefrom by aluminium or thermosetting plastics spacers 16. The spacing and quantity of reclaimed plastics material for the inner skin is chosen so as to substantially encapsulate the mesh, thereby enhancing the mechanical properties of the finished panel. In alternative embodiments requiring additional rigidity, the reinforcing means may be comprised of angle or channel profiled members.

Figure 4:
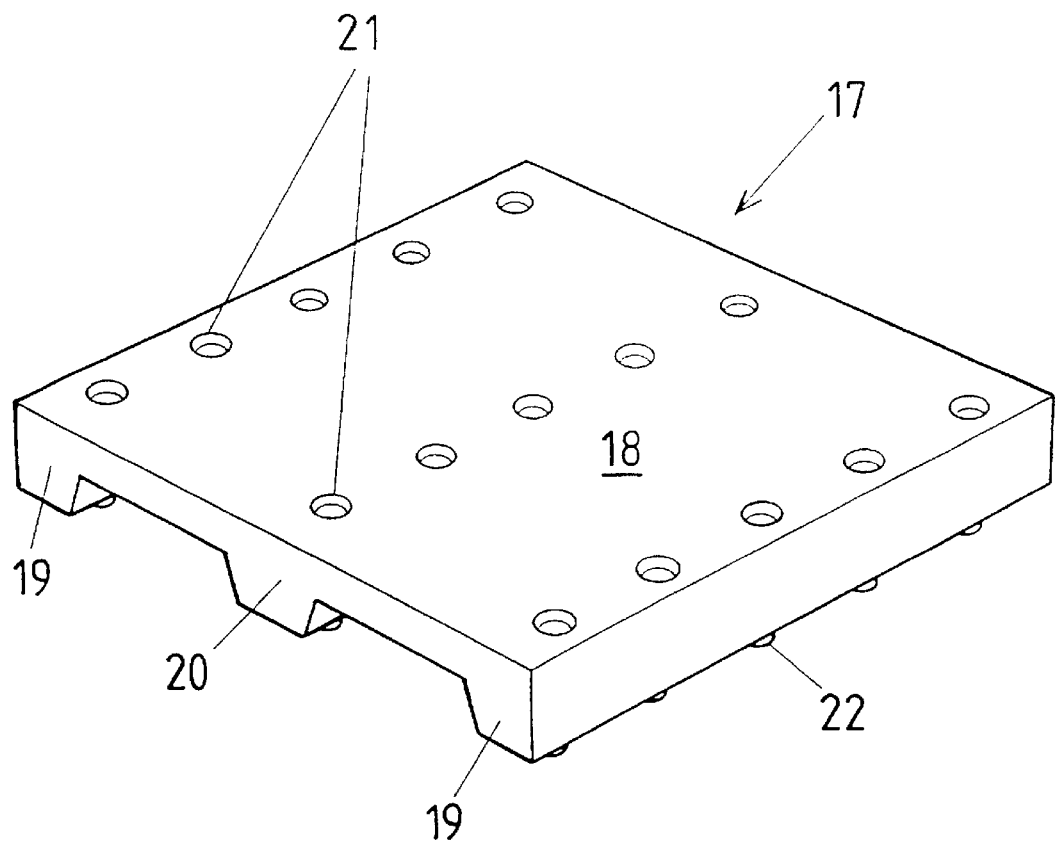
FIG. 4 is an isometric view of an alternative embodiment of a shipping pallet manufactured in accordance with the invention.
Figure 5:
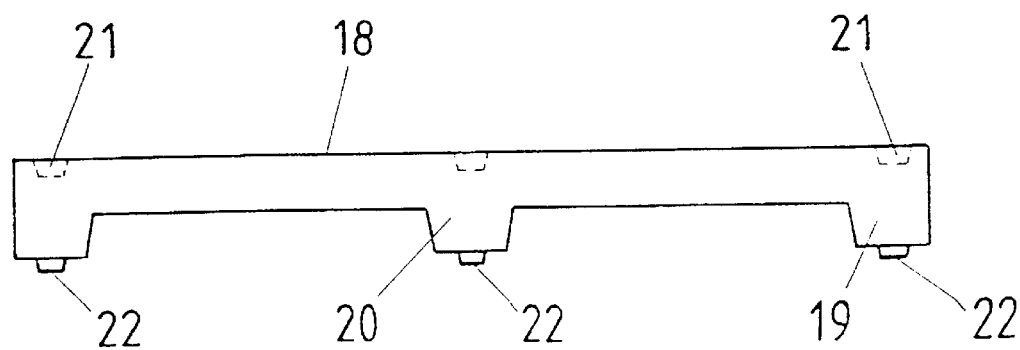
FIG. 5 is a front elevation of the shipping pallet shown in FIG. 4.

FIG. 4 shows another embodiment of a shipping pallet 17, which includes a deck 18 and, in addition to the end rails 19, a central support rail 20. The central rail provides additional support for the deck thereby resulting in an improved load carrying capacity. In order to facilitate stacking of empty pallets, the deck 18 includes a plurality of recesses 21 in its upper surface. The recess are arranged to cooperate with lugs 22 disposed on the lower surface of the rails, as depicted in FIG. 5.

The recess and lug combination is but one arrangement which could be used in this application. One alternative might include providing slots in the upper surface of the deck, which slots are arranged to cooperate with the end and central rails, omitting the lugs entirely. In another alternative, the rails might be replaced by a series depending legs which cooperate with enlarged recesses provided in the deck of the pallet.

The composite products constructed in accordance with the invention exhibit the advantages of high grade polyolefins without the disadvantages of reclaimed plastics materials.

Throughout the specification the aim has been to describe the preferred embodiments of the invention without limiting the invention to any one embodiment or specific collection of features.

What is claimed is:

1. A method for rotational moulding of articles, comprising the steps of:
   (a) rotationally moulding a mixture of particulate plastic material including at least one thermoplastic material having a first particle size and a second thermoplastic material comprised of a reclaimed plastic material and having a larger particle size; said second thermoplastic material having a melt temperature higher than the melt temperature of the first thermoplastic material, said first thermoplastic material being homopolymeric, and said second thermoplastic material being a mixture of polymeric species;
   (b) wherein, in use, said first thermoplastic material fuses to form an outer skin and subsequently said second thermoplastic material fuses to form an inner skin bonded to the outer skin of a resultant moulded article.

2. A method for rotational moulding of articles as claimed in claim 1, wherein the second thermoplastic material includes a quantity of thermosetting polymeric material.

3. A method for rotational moulding of articles as claimed in claim 1, wherein the second thermoplastic material includes a quantity of foaming agent.

4. A method for rotational moulding of articles as claimed in claim 3, wherein the foaming agent has a decomposition temperature greater than the melt temperature of the second thermoplastic material.

5. A method for rotational moulding of articles as claimed in claim 1, wherein the second thermoplastic material includes a quantity of filler material.

6. A method for rotational moulding of articles as claimed in claim 1, wherein particles of the second thermoplastic material include an adhesion resistant coating to reduce adhesion between the second thermoplastic material and the first thermoplastic material during the fusing of the outer skin.

7. A method for rotational moulding of articles, comprising the steps of:
   (a) rotationally moulding a mixture of particulate plastic material including at least one thermoplastic material having a first particle size and a second thermoplastic material comprised of reclaimed plastics material and having a larger particle size, said second thermoplastic material having a melt temperature higher than the melt temperature of the first thermoplastic material, said first thermoplastic material being homopolymeric, and said second thermoplastic material being a mixture of polymeric species; and
   (b) incorporating a quantity of rollable moulded reinforcing elements in the mold with said first and second thermoplastic material;
   (c) wherein, in use, said first thermoplastic material fuses to form an outer skin and subsequently said second thermoplastic material fuses to form an inner skin bonded to the outer skin of a resultant moulded article and wherein the reinforcing elements are located in a spaced array thereby forming bridges between opposed inner skin surfaces as they expand.

8. A method for rotational moulding of articles as claimed in claim 7, wherein the reinforcing elements are larger than the particle size of the second thermoplastic material.

9. A method for rotational moulding of articles as claimed in claim 7, wherein the reinforcing elements are mechanically engaged between the opposed inner skin surfaces.

10. A method for rotational moulding of articles as claimed in claim 8, wherein the reinforcing elements are at least partially fused to said opposed inner skin surfaces.

11. A method for rotational moudling of articles as claimed in claim 7, wherein the reinforcing elements include an adhesion resistant coating to reduce adhesion between the reinforcing elements and the first and second thermoplastic material during the fusing of said skins.

12. A method for rotational moulding of articles as claimed in claim 7, wherein the reinforcing elements include an adhesion resistant additive to reduce adhesion between the reinforcing elements and the first and second thermoplastic material during the fusing of said skins.

13. A method for rotational moulding of articles as claimed in claim 7, wherein the reinforcing elements are comprised of plastic material.

14. A method for rotational moulding of articles as claimed in claim 7, wherein the reinforcing elements are comprised of ceramic material.

15. A rotationally moulded article of manufacture comprising an outer skin and an inner skin which article is manufactured using the rotational moulding method claimed in claim 7.

16. A rotationally moulded article of manufacture comprising an outer skin and an inner skin which article is manufactured using the rotational moulding method claimed in claim 7.

17. A rotationally moulded article of manufacture, comprising a shipping pallet, manhole cover, tank lid, or utility pit cover, said article comprising an outer skin, an inner skin and a quantity of rollable moulded reinforcing elements forming bridges between opposed inner skin surfaces when manufactured using the rotational moulding method claimed in claim 7.

* * * * *